United States Patent
Golitschek Edler von Elbwart et al.

(10) Patent No.: US 10,270,578 B2
(45) Date of Patent: *Apr. 23, 2019

(54) SEARCH SPACE FOR NON-INTERLEAVED R-PDDCH

(71) Applicant: Sun Patent Trust, New York, NY (US)

(72) Inventors: Alexander Golitschek Edler von Elbwart, Darmstadt (DE); Sujuan Feng, Frankfurt am Main (DE); Christian Wengerter, Kleinheubach (DE); Hidetoshi Suzuki, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,919

(22) Filed: Feb. 22, 2018

(65) Prior Publication Data

US 2018/0183559 A1     Jun. 28, 2018

Related U.S. Application Data

(63) Continuation of application No. 14/866,661, filed on Sep. 25, 2015, now Pat. No. 9,935,754, which is a
(Continued)

(30) Foreign Application Priority Data

Oct. 1, 2010   (EP) .................................... 10012822

(51) Int. Cl.
   *H04L 12/28*   (2006.01)
   *H04L 5/14*    (2006.01)
(Continued)

(52) U.S. Cl.
   CPC .......... *H04L 5/0053* (2013.01); *H04L 5/0037* (2013.01); *H04L 27/261* (2013.01);
(Continued)

(58) Field of Classification Search
   CPC combination set(s) only.
   See application file for complete search history.

(56) References Cited

U.S. PATENT DOCUMENTS

2010/0098020 A1   4/2010   Kim et al.
2010/0120442 A1   5/2010   Zhuang et al.
(Continued)

FOREIGN PATENT DOCUMENTS

EP   2 207 271 A1   7/2010
WO   2008041819 A2  4/2008
WO   2009087742 A1  7/2009

OTHER PUBLICATIONS

ETSI TR 125 913 V8.0.0, "Universal Mobile Telecommunications Systems (UMTS); LTE; Requirements for Evolved Utra (E-UTRA)and Evolved UTRAN (E-UTRAB) (3GPP TR 25.913 version 8.0.0 Release 8)," Jan. 2009, 20 pages.
(Continued)

*Primary Examiner* — Faruk Hamza
*Assistant Examiner* — Abusayeed M Haque
(74) *Attorney, Agent, or Firm* — Seed IP Law Group LLP

(57) ABSTRACT

The present invention relates to providing control information within a search space for blind decoding in a multi-carrier communication system. In particular, the control information is carried within a sub-frame of the communication system, the sub-frame including a plurality of control channel elements. The control channel elements may be aggregated into candidates for blind decoding. The number of control channel elements in a candidate is called aggregation level. In accordance with the present invention, the
(Continued)

candidates of lower aggregation levels are localized, meaning that the control channel elements of one candidate are located adjacently to each other in the frequency domain. Some candidates of the higher aggregation level(s) are distributed in the frequency.

7 Claims, 10 Drawing Sheets

Related U.S. Application Data continuation of application No. 13/822,618, filed as application No. PCT/EP2011/004783 on Sep. 23, 2011, now Pat. No. 9,173,213.

(51) Int. Cl.
| | |
|---|---|
| H04W 84/18 | (2009.01) |
| H04L 29/06 | (2006.01) |
| H04L 5/00 | (2006.01) |
| H04L 27/26 | (2006.01) |
| H04W 72/04 | (2009.01) |
| H04L 1/00 | (2006.01) |

(52) U.S. Cl.
CPC ..... *H04W 72/042* (2013.01); *H04W 72/0453* (2013.01); *H04L 1/009* (2013.01); *H04L 1/0038* (2013.01); *H04L 1/0046* (2013.01); *H04L 1/0091* (2013.01); *H04L 2001/0097* (2013.01)

(56) References Cited

U.S. PATENT DOCUMENTS

| | | | | |
|---|---|---|---|---|
| 2010/0254268 | A1* | 10/2010 | Kim | H04W 36/385 370/241 |
| 2010/0279628 | A1 | 11/2010 | Love et al. | |
| 2010/0290418 | A1 | 11/2010 | Nishio et al. | |
| 2010/0304689 | A1* | 12/2010 | McBeath | H04L 5/0005 455/68 |
| 2010/0316146 | A1* | 12/2010 | McBeath | H04L 5/0091 375/260 |
| 2011/0069637 | A1 | 3/2011 | Liu et al. | |
| 2011/0076962 | A1 | 3/2011 | Chen et al. | |
| 2011/0267967 | A1 | 11/2011 | Ratasuk et al. | |
| 2011/0310856 | A1* | 12/2011 | Hariharan | H04L 1/1607 370/336 |
| 2012/0033643 | A1* | 2/2012 | Noh | H04L 5/0048 370/335 |
| 2012/0093118 | A1* | 4/2012 | Peters | H04L 1/0081 370/329 |
| 2012/0113936 | A1* | 5/2012 | Moulsley | H04L 5/0044 370/329 |
| 2012/0195267 | A1 | 8/2012 | Dai et al. | |
| 2013/0222645 | A1* | 8/2013 | Bilcu | G06T 9/00 348/239 |

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Section 6.2, Dec. 2009, 11 pages.

3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.

LG Electronics, "Search Space Design for Non-interleaved R-PDCCH," R1-104657, 3GPP TSG RAN WG1 Meeting #62, Agenda Item: 6.6.4, Madrid, Spain, Aug. 23-27, 2010, 6 pages.

ZTE, "A mechanism for reducing R-DPCCH signaling overhead," R2-103732, 3GPP TSG TAN WG2 #70bis, Agenda Item: 7.2.1.5, Stockholm, Sweden, Jun. 28-Jul. 2, 2010, 5 pages.

Japanese Notice of Reason for Rejection, dated Nov. 11, 2014, for corresponding Japanese Application No. 2013-530611, 7 pages.

International Search Report, dated Oct. 21, 2011, for corresponding International Application No. PCT/EP2011/004783, 4 pages.

Extended European Search Report dated Apr. 4, 2011, for corresponding EP Application No. 10012822.2, 12 pages.

\* cited by examiner

US 10,270,578 B2

SEARCH SPACE FOR NON-INTERLEAVED R-PDDCH

FIELD OF THE INVENTION

The present invention relates to signaling uplink and downlink grant in an OFDM-based mobile communication system. In particular, the present invention relates to methods and apparatuses for configuration of search space and to search space channel structure for signaling of the uplink and downlink grant control information.

BACKGROUND OF THE INVENTION

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3GPP TR 25.913, "Requirements for evolved UTRA (E-UTRA) and evolved UTRAN (E-UTRAN)," v8.0.0, January 2009, (available at http://www.3gpp.org/ and incorporated herein by reference). The Downlink will support data modulation schemes QPSK, 16 QAM, and 64 QAM and the Uplink will support BPSK, QPSK, 8 PSK and 16 QAM.

LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames 100 each of which is divided into two downlink slots 110 and 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

FIG. 2 is an example illustrating further details of LTE resources. In particular, the smallest unit of resources that can be assigned by a scheduler is a resource block also called physical resource block (PRB). A PRB 210 is defined as $N^{DL}_{symb}$ consecutive OFDM symbols in the time domain and $N^{RB}_{sc}$ consecutive sub-carriers in the frequency domain. In practice, the downlink resources are assigned in resource block pairs. A resource block pair consists of two resource blocks. It spans $N^{RB}_{sc}$ consecutive sub-carriers in the frequency domain and the entire $2 \cdot N^{DL}_{symb}$ modulation symbols of the sub-frame in the time domain. $N^{DL}_{symb}$ may be either 6 or 7 resulting in either 12 or 14 OFDM symbols in total. Consequently, a physical resource block 210 consists of $N^{DL}_{symb} \times N^{RB}_{sc}$ resource elements 220 corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 8)", version 8.9.0, December 2009, Section 6.2, available at http://www.3gpp.org. which is incorporated herein by reference).

The number of physical resource blocks $N^{DL}_{RB}$ in downlink depends on the downlink transmission bandwidth configured in the cell and is at present defined in LTE as being from the interval of 6 to 110 PRBs.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:

Localized Virtual Resource Block (LVRB)
Distributed Virtual Resource Block (DVRB)

In the localized transmission mode using the localized VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 there is only one component carrier in uplink and downlink. Downlink control signaling is basically carried by the following three physical channels:

Physical control format indicator channel (PCFICH) for indicating the number of OFDM symbols used for control signaling in a sub-frame (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signaling region of a downlink sub-frame using a known pre-defined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted on the first of either one, two or three OFDM symbols according to PCFICH within a sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimize the overhead for such an indication, thereby decreasing the control overhead to data ratio for a transmission. The size of RBG is currently specified to be 1, 2, 3, or 4, depending on the system bandwidth, in particular, on $N^{DL}_{RB}$. Further details of RBG mapping for PDCCH in LTE Release 8 may be found in 3GPP TS 36.213 "Evolved Universal terrestrial Radio Access (E-UTRA); Physical layer procedures", v8.8.0, September 2009, Section 7.1.6.1, freely available at http://www.3gpp.org/ and incorporated herein by reference.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

FIG. 3 shows an exemplary mapping of PDCCH and PDSCH within a sub-frame. The first two OFDM symbols form a control channel region (PDCCH region) and are used for L1/L2 control signaling. The remaining twelve OFDM symbols form data channel region (PDSCH region) and are used for data. Within a resource block pairs of all sub-frames, cell-specific reference signals, so-called common reference signals (CRS), are transmitted on one or several antenna ports 0 to 3. In the example of FIG. 3, the CRS are transmitted from two antenna ports: R0 and R1.

Moreover, the sub-frame also includes UE-specific reference signals, so-called demodulation reference signals (DM-RS) used by the user equipment for demodulating the PDSCH. The DM-RS are only transmitted within the resource blocks in which the PDSCH is allocated for a certain user equipment. In order to support multiple input/multiple output (MIMO) with DM-RS, four DM-RS layers are defined meaning that at most, MIMO of four layers is supported. In this example, in FIG. 3, DM-RS layer 1, 2, 3 and 4 are corresponding to MIMO layer 1, 2, 3 and 4.

One of the key features of LTE is the possibility to transmit multicast or broadcast data from multiple cells over a synchronized single frequency network which is known as multimedia broadcast single frequency network (MBSFN) operation. In MBSFN operation, UE receives and combines synchronized signals from multiple cells. To facilitate this, UE needs to perform a separate channel estimation based on an MBSFN reference signal. In order to avoid mixing the MBSFN reference signal and normal reference signal in the same sub-frame, certain sub-frames known as MBSFN sub-frames are reserved from MBSFN transmission. The structure of an MBSFN sub-frame is shown in FIG. 4 up to two of the first OFDM symbols are reserved for non-MBSFN transmission and the remaining OFDM symbols are used for MBSFN transmission. In the first up to two OFDM symbols, PDCCH for uplink resource assignments and PHICH can be transmitted and the cell-specific reference signal is the same as non-MBSFN transmission sub-frames. The particular pattern of MBSFN sub-frames in one cell is broadcasted in the system information of the cell. UEs not capable of receiving MBSFN will decode the first up to two OFDM symbols and ignore the remaining OFDM symbols. MBSFN sub-frame configuration supports both 10 ms and 40 ms periodicity. However, sub-frames with number 0, 4, 5 and 9 cannot be configured as MBSFN sub-frames. FIG. 4 illustrates the format of an MBSFN sub-frame.

The PDCCH information sent on the L1/L2 control signaling may be separated into the shared control information and dedicated control information. The frequency spectrum for IMT-advanced was decided at the World Radio Communication Conference (WRC-07) in November 2008. However, the actual available frequency bandwidth may differ for each region or country. The enhancement of LTE standardized by 3GPP is called LTE-advanced (LTE-A) and has been approved as the subject matter of Release 10. LTE-A Release 10 employs carrier aggregation according to which two or more component carriers as defined for LTE Release 8 are aggregated in order to support wider transmission bandwidth, for instance, transmission bandwidth up to 100 MHz. It is commonly assumed that the single component carrier does not exceed a bandwidth of 20 MHz. A terminal may simultaneously receive and/or transmit on one or multiple component carriers depending on its capabilities.

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas.

A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay. At least, "type 1" relay nodes will be a part of 3GPP LTE-A. A "type 1" relay node is a relaying node characterized by the following:

The relay node controls cells each of which appears to a user equipment as a separate cell distinct from the donor cell.

The cells should have its own physical cell ID as defined in LTE Release 8 and the relay node shall transmit its own synchronization channels, reference symbols etc.

Regarding the single cell operation, the UE should receive scheduling information and HARQ feedback directly from the relay node and send its controlled information (acknowledgments, channel quality indications, scheduling requests) to the relay node.

The relay node should appear as a 3GPP LTE compliant eNodeB to 3GPP LTE compliant user equipment in order to support the backward compatibility.

The relay node should appear differently to the 3GPP LTE eNodeB in order to allow for further performance enhancements to the 3GPP LTE-A compliant user equipments.

FIG. 5 illustrates an example 3GPP LTE-A network structure using relay nodes. A donor eNodeB (d-eNB) 510 directly serves a user equipment UE1 515 and a relay node (RN) 520 which further serves UE2 525. The link between donor eNodeB 510 and the relay node 520 is typically referred to as relay backhaul uplink/downlink. The link between the relay node 520 and user equipment 525 attached to the relay node (also denoted r-UEs) is called (relay) access link.

The donor eNodeB transmits L1/L2 control and data to the micro-user equipment UE1 515 and also to a relay node 520 which further transmits the L1/L2 control and data to the relay-user equipment UE2 525. The relay node may operate in a so-called time multiplexing mode, in which transmission and reception operation cannot be performed at the same time. In particular, if the link from eNodeB 510 to relay node 520 operates in the same frequency spectrum as the link from relay node 520 to UE2 525, due to the relay transmitter causing interference to its own receiver, simultaneous eNodeB-to-relay node and relay node-to-UE transmissions on the same frequency resources may not be possible unless sufficient isolation of the outgoing and incoming signals is provided. Thus, when relay node 520 transmits to donor eNodeB 510, it cannot, at the same time, receive from UEs 525 attached to the relay node. Similarly, when a relay node 520 receives data from donor eNodeB, it cannot transmit data to UEs 525 attached to the relay node. Thus, there is a sub-frame partitioning between relay backhaul link and relay access link.

Regarding the support of relay nodes, in 3GPP it has currently been agreed that:

Relay backhaul downlink sub-frames during which eNodeB to relay downlink backhaul transmission is configured, are semi-statically assigned.

Relay backhaul uplink sub-frames during which relay-to-eNodeB uplink backhaul transmission is configured are semi-statically assigned or implicitly derived by HARQ timing from relay backhaul downlink sub-frames.

In relay backhaul downlink sub-frames, a relay node will transmit to donor eNodeB and consequently r-UEs are not supposed to expect receiving any data from the relay node. In order to support backward compatibility for UEs that are not aware of their attachment to a relay node (such as Release 8 UEs for which a relay node appears to be a standard eNodeB), the relay node configures backhaul downlink sub-frames as MBSFN sub-frames.

In the following, a network configuration as shown in FIG. 5 is assumed for exemplary purposes. The donor eNodeB transmits L1/L2 control and data to the macro-user equipment (UE1) and 510 also to the relay (relay node) 520, and the relay node 520 transmits L1/L2 control and data to the relay-user equipment (UE2) 525. Further assuming that the relay node operates in a time-duplexing mode, i.e. transmission and reception operation are not performed at the same time, we arrive at a non-exhaustive entity behavior over time as shown in FIG. 6. Whenever the relay node is in "transmit" mode, UE2 needs to receive the L1/L2 control channel and physical downlink shared channel (PDSCH), while when the relay node is in "receive" mode, i.e. it is receiving L1/L2 control channel and PDSCH from the Node B, it cannot transmit to UE2 and therefore UE2 cannot receive any information from the relay node in such a sub-frame. In the case that the UE2 is not aware that it is attached to a relay node (for instance, a Release-8 UE), the relay node 520 has to behave as a normal (e-)NodeB. As will be understood by those skilled in the art, in a communication system without relay node any user equipment can always assume that at least the L1/L2 control signal is present in every sub-frame. In order to support such a user equipment in operation beneath a relay node, the relay node should therefore pretend such an expected behavior in all sub-frames.

As shown in FIGS. 3 and 4, each downlink sub-frame consists of two parts, control channel region and data region. FIG. 7 illustrates an example of configuring MBSFN frames on relay access link in situation, in which relay backhaul transmission takes place. Each subframe comprises a control data portion 710, 720 and a data portion 730, 740. The first OFDM symbols 720 in an MBSFN subframe are used by the relay node 520 to transmit control symbols to the r-UEs 525. In the remaining part of the sub-frame, the relay node may receive data 740 from the donor eNodeB 510. Thus, there cannot be any transmission from the relay node 520 to the r-UE 525 in the same sub-frame. The r-UE receives the first up to two OFDM control symbols and ignores the remaining part of the sub-frame. Non-MBSFN sub-frames are transmitted from the relay node 520 to the r-UE 525 and the control symbols 710 as well as the data symbols 730 are processed by the r-UE 525. An MBSFN sub-frame can be configured for every 10 ms on every 40 ms. Thus, the relay backhaul downlink sub-frames also support both 10 ms and 40 ms configurations. Similarly to the MBSFN sub-frame configuration, the relay backhaul downlink sub-frames cannot be configured at sub-frames with #0, #4, #5 and #9.

Since MBSFN sub-frames are configured at relay nodes as downlink backhaul downlink sub-frames, the relay node cannot receive PDCCH from the donor eNodeB. Therefore, a new physical control channel (R-PDCCH) is used to dynamically or "semi-persistently" assign resources within the semi-statically assigned sub-frames for the downlink and uplink backhaul data. The downlink backhaul data is transmitted on a new physical data channel (R-PDSCH) and the uplink backhaul data is transmitted on a new physical data channel (R-PUSCH). The R-PDCCH(s) for the relay node is/are mapped to an R-PDCCH region within the PDSCH region of the sub-frame. The relay node expects to receive R-PDCCH within the region of the sub-frame. In time domain, the R-PDCCH region spans the configured downlink backhaul sub-frames. In frequency domain, the R-PDCCH region exists on certain resource blocks preconfigured for the relay node by higher layer signaling. Regarding the design and use of an R-PDCCH region within a sub-frame, the following characteristics have been agreed so far in standardization:

R-PDCCH is assigned PRBs for transmission semi-statically. Moreover, the set of resources to be currently used for R-PDCCH transmission within the above semi-statically assigned PRBs may vary dynamically, between sub-frames.

The dynamically configurable resources may cover the full set of OFDM symbols available for the backhaul link or may be constrained to their sub-set.

The resources that are not used for R-PDCCH within the semi-statically assigned PRBs may be used to carry R-PDSCH or PDSCH.

In case of MBSFN sub-frames, the relay node transmits control signals to the r-UEs. Then, it can become necessary to switch transmitting to receiving mode so that the relay node may receive data transmitted by the donor eNodeB within the same sub-frame. In addition to this gap, the propagation delay for the signal between the donor eNodeB and the relay node has to be taken into account. Thus, the R-PDCCH is first transmitted starting from an OFDM symbol which, within the sub-frame, is late enough in order for a relay node to receive it.

The mapping of R-PDCCH on the physical resources may be performed either in a frequency distributed manner or in a frequency localised manner.

The interleaving of R-PDCCH within the limited number of PRBs can achieve diversity gain and, at the same time, limit the number of PRBs wasted.

In non-MBSFN sub-frames, Release 10 DM-RS is used when DM-RS are configured by ENodeB. Otherwise, Release 8 CRS are used. In MBSFN sub-frames, Release 10 DM-RS are used.

R-PDCCH can be used for assigning downlink grant or uplink grant for the backhaul link. The boundary of downlink grant search space and uplink grant search space is a slot boundary of the sub-frame. In particular, the downlink grant is only transmitted in the first slot and the uplink grant is only transmitted in the second slot of the sub-frame.

No interleaving is applied when demodulating with DM-RS. When demodulating with CRS, both REG level interleaving and no interleaving are supported.

Based on the above agreement, there are basically three different options for configuration of the R-PDCCH search space:
  Frequency localized non-interleaved R-PDCCH,
  Frequency distributed non-interleaved R-PDCCH, and
  REG-level interleaved R-PDCCH.

For the REG-level interleaved R-PDCCH, the Release 8 PDCCH search space scheme will be reused within the semi-statically configured PRBs for R-PDCCH (the so-called R-PDCCH virtual bandwidth). For the non-interleaved R-PDCCH, the Release 8 PDCCH search space concept of randomizing the positions of PDCCH candidates for different aggregation levels across the whole bandwidth could theoretically be applied, but would not facilitate the benefit that the candidates can be in positions which can be freely assigned by the eNodeB. This would, in turn, make it impossible to exploit the full frequency-selective scheduling benefit for the control channel.

SUMMARY OF THE INVENTION

In view of the above, the aim of the present invention is to provide an efficient scheme for configuring a search space in which control information, which may contain uplink and downlink grants (or assignments) for a shared channel, can be signaled to a receiver, or particularly to a relay node.

This is achieved by the features of independent claims.

Advantageous embodiments of the invention are subject to the dependent claims.

It is the particular approach of the present invention to provide a search space configuration with localized lower aggregation level candidates and at least one distributed candidate of a higher aggregation level.

In accordance with an aspect of the present invention, a method is provided for receiving control data within a subframe in a multi-carrier communication system, the method comprising the following steps to be performed at a receiving node: receiving a sub-frame from a transmitting node, wherein the sub-frame is logically divided into physical resource blocks and comprises a plurality of control channel elements; and performing a blind detection for a control information within a predefined search space of the sub-frame. Said search space is logically subdivided into candidates for performing blind detection, each candidate comprising one or more aggregated control channel elements, wherein at least one candidate having a first number of aggregated control channel elements consists of control channel elements placed adjacent in frequency, and at least one candidate having a second number of aggregated control channel elements, greater than the first number, consists of control channel elements at least partially distributed in frequency.

In accordance with another aspect of the present invention, a method is provided for transmitting control information for at least one receiving node within a subframe of a multi-carrier communication system, the method comprising the following steps to be performed at the transmitting node: mapping control information for a receiving node onto a predefined search space in a subframe, the search space comprising resources on which receiving node is to perform a blind detection, wherein said search space is logically subdivided into candidates for blind detection, each candidate comprising one or more aggregated control channel elements, wherein at least one candidate having a first number of aggregated control channel elements consists of control channel elements placed adjacent in frequency, and at least one candidate having a second number of aggregated control channel elements, greater than the first number, consists of control channel elements at least partially distributed in frequency; and transmitting the subframe to the at least one receiving node.

In accordance with another aspect of the present invention, a receiving apparatus is provided for receiving a control information within a subframe of a multi-carrier communication system, the apparatus comprising: a receiving unit for receiving a sub-frame from a transmitting node, wherein the sub-frame comprises a plurality of control channel elements; and a detecting unit for performing a blind detection for a control information within a predefined search space of the sub-frame, wherein said search space is logically subdivided into candidates for which the blind detection is to performed, each candidate comprising one or more aggregated control channel elements, wherein at least one candidate having a first number of aggregated control channel elements consists of control channel elements placed adjacent in frequency, and at least one candidate having a second number of aggregated control channel elements, greater than the first number, consists of control channel elements at least partially distributed in frequency.

In accordance with another aspect of the present invention a transmitting apparatus is provided for transmitting control information for at least one receiving node within a sub-frame of a multi-carrier communication system, the apparatus comprising: a mapping unit for mapping control information for a receiving node onto a predefined search space in a subframe, the search space comprising resources on which receiving node is to perform a blind detection, wherein said search space is logically subdivided into candidates for blind detection, each candidate comprising one or more aggregated control channel elements, wherein at least one candidate having a first number of aggregated control channel elements consists of control channel elements placed adjacent in frequency, and at least one candidate having a second number of aggregated control channel elements, greater than the first number, consists of control channel elements at least partially distributed in frequency; and a transmitting unit for transmitting the sub-frame to the at least one receiving node.

Accordingly, the robustness and resilience against fading dip is increased for the higher aggregation level candidates even if localized candidates are configured. In other words, the present invention suggests distributing at least partially at least one of the higher aggregation level candidates in the frequency domain. Here the term "to distribute" refers to mapping the candidate on control channel elements which are not all mapped on sequentially adjacent physical resource blocks in frequency. Thus, at least one other physical resource block separates at least two portions of the control channel elements of the candidate.

Advantageously, the first number of aggregated control channel elements is 1 or 2 and the second number of aggregated control channel elements is 4 or 8. Preferably, one candidate with the second number of aggregated control channel elements is distributed over single control channel element and/or candidate with 8 aggregated control channel elements is distributed over portions with size of 2 control channel elements, where a portion generally resembles two or more sequentially adjacent physical resource blocks. These particular numbers are especially advantageous with regard to the LTE/LTE-A system, which now support aggregation levels 1, 2, 4, and 8. The selection of these numbers enables localization of aggregation level 2 and distributes at least one candidate of aggregation level 4 and/or 8, which increase the detection robustness for these distributed candidates. However, the present invention is not limited to these numbers. Depending on the system to be deployed in, the aggregation levels of 3, 5, 6, etc. may also be supported. In general, the selection of the aggregation levels the candidates of which are to be distributed may be performed with regard to the frequency band in which the candidates are defined and the expected fading characteristics.

In accordance with an embodiment of the present invention, the control channel elements correspond to the Control Channel Elements (CCEs) as defined in 3GPP LTE/LTE-A. In accordance with another embodiment of the present invention, the control channel elements correspond to physical resource blocks of 3GPP LTE/LTE-A. However, the present invention is not limited thereto and the control channel elements of the present invention may be any resources defined in the time/frequency domain.

Advantageously, at least one candidate with the second number of aggregated control channel elements is mapped on physical resource blocks adjacent in frequency (i.e. in a localized manner) and at least one other candidate with the second number of aggregated control channel elements is mapped on physical resource blocks distributed in frequency. A localized manner is advantageously employed if the fading and/or noise and interference characteristic is flat in frequency domain, such that adjacent physical resource blocks have a very high probability of having very similar channel characteristics. For most aspects, the most important channel characteristics include amplitude and phase changes due to signal fading and propagation, noise, interference, and/or frequency shift. Consequently, with a good knowledge of the channel characteristic, the channel capacity can be very efficiently exploited by using a localized manner by selective using the best channel resource(s). Conversely, without such knowledge or with an inaccurate knowledge, it is beneficial to use distributed channel resources in order to try to hit at least some resources where the channel state is good (i.e. in a more or less random fashion).

Preferably, the distributing of the candidate with the second number of aggregated control channel elements in frequency is performed by mapping said candidate onto portions with a third number of control channel elements, the portions being further mapped to the frequency in a distributed way, i.e. separated from each other by at least one physical resource block. The third number is lower than the second number. In particular the control channel elements of a candidate may be distributed to the positions in frequency corresponding to positions candidates of a lower aggregation level than the second number. For instance, a candidate of aggregation level 4 or 8 may be distributed in multiple portions, where a portion consists of control channel elements mapped to two adjacent physical resource blocks, and where at least one such portions on its own would constitute an aggregation level 2 candidate, or even each such portion would constitute an aggregation level 2 candidate. However, the distribution of the portions does not need to be performed over positions of lower level candidates. Any control channel element positions in frequency may be taken. Using the same positions has benefits to pack the candidates in as few physical resource blocks as possible, thereby minimizing the amount of physical resource blocks that cannot be used for shared data channel transmission. Using different positions has benefits to allow the transmission of different candidates with different aggregation levels without affecting each other, i.e. the transmission of a candidate with a lower aggregation level does not block the transmission of a candidate with a higher aggregation level, and vice versa. It is advantageous to distribute the portions possibly far from each other in the frequency domain and/or possibly far from other candidates to achieve higher diversity.

Alternatively, the candidate may be distributed to a plurality of single control channel elements mapped to physical resource blocks separated from each other in frequency by at least one physical resource block.

Advantageously, the positions of distributed candidates with the second number of aggregated control channel elements for a first receiving node are different to positions of distributed candidates with the second number of aggregated control channel elements for a second receiving node. This enables an efficient mapping without blocking the resources for the receiving-node-dedicated signaling.

According to an embodiment of the present invention, candidates with a higher number of aggregated control channel elements localized on adjacent frequencies are located in frequency without overlapping with candidates with a lower number of aggregated control channel elements. Such an arrangement is particularly advantageous since it enables efficient utilization of resources without blocking. This means, for instance, that assignment of level 1 candidates does not block assignment of a level 2 candidate but rather, both may be assigned to the same or different receiving nodes.

In particular, according to an embodiment of the present invention, the control channel elements are mapped on physical resource blocks and a fourth number of physical resource blocks form a resource block group, the candidates being mapped to control channel elements which are included in physical resource blocks of a resource block group. Candidates with a lower number of control channel elements are localized, mapped on adjacent (in frequency) physical resource blocks starting with the first physical resource block of a resource block group, and candidates with a higher number of aggregated control channel elements are localized, mapped on adjacent physical resource blocks ending on the last physical resource block of the resource block group, where for candidates with a higher number of aggregated control channel elements than the size of a resource block group, a candidate fills a first resource block group completely and an adjacent second resource block group at least partly. Such a mapping is likely to avoid overlapping of candidates of different aggregation levels and is, thus, efficient with respect to the resource utilization. The fourth number may be, for instance 2, 3, or 4. However, in general any other number may be supported as well. The fourth number equal to 1 means that a physical resource block alone corresponds to a resource block group.

Alternatively, in order to avoid the overlapping of candidates having different aggregation levels, candidates with a higher number of aggregated control channel elements mapped localized on adjacent physical resource blocks are located in frequency in physical resource blocks shifted with respect to the positions of the candidates with a lower number of aggregated control channel elements, each lower aggregation candidate being mapped localized on adjacent physical resource blocks. In particular, the shift is sufficient so that the candidates do not overlap, for instance it may have the size of the lower number of aggregated control channel elements, meaning that the higher-level candidate starts in a physical resource block next to the lower-level candidate.

Preferably, the receiving node is a relay node, transmitting node is a donor eNodeB in a 3GPP LTE(-A) based system, and the physical downlink control channel is R-PDCCH without physical resource block interleaving in time domain. However, alternatively or in addition, a regular mobile terminal may act as the receiving node, in order to benefit from a localized control information transmission.

In accordance with another embodiment of the present invention, the higher level candidates of different receiving nodes are distributed to positions that do not overlap. The positions of localized candidates with the first number of aggregated physical resource blocks may be identical for a first receiving node and a second receiving node.

In accordance with another aspect of the present invention, a computer program product comprising a computer-readable medium having a computer-readable program code embodied thereon is provided, the program code being adapted to carry out the present invention.

The above and other objects and features of the present invention will become more apparent from the following description and preferred embodiments given in conjunction with the accompanying drawings in which.

Figure 15:
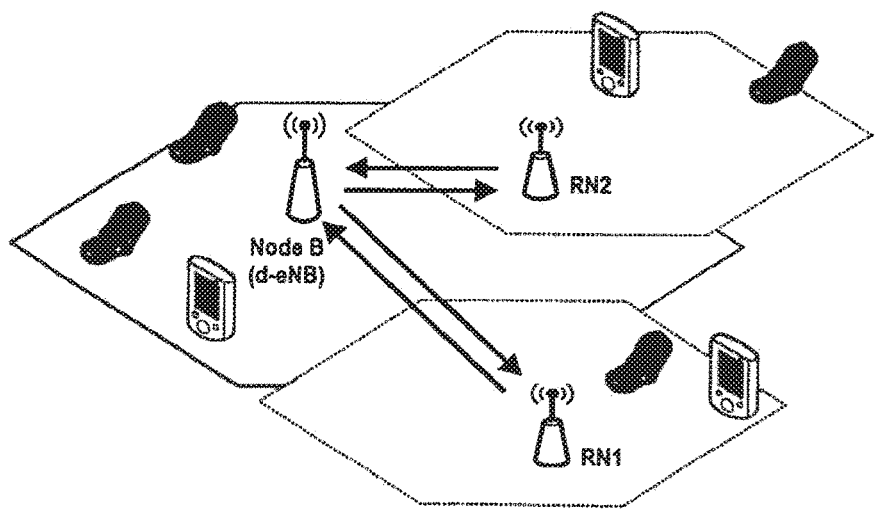
Figure 10:
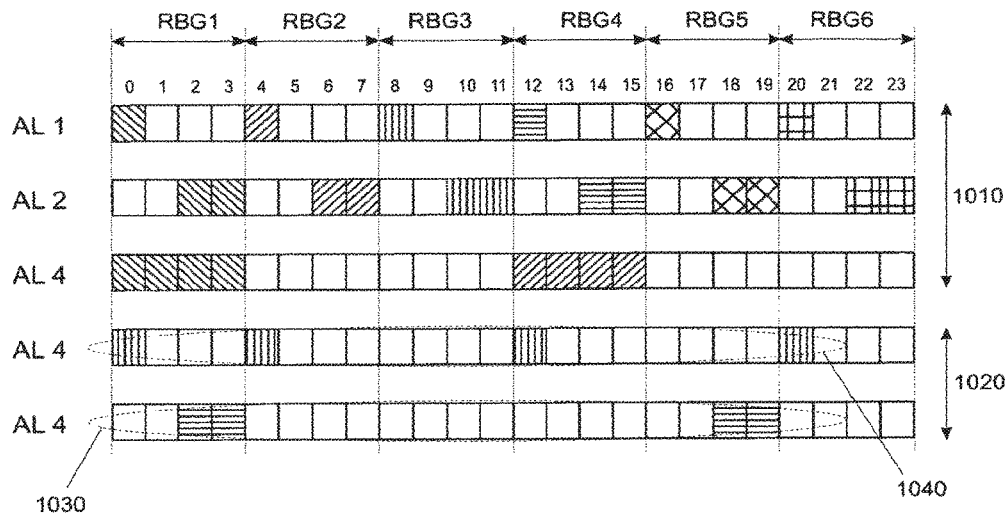
Figure 11:
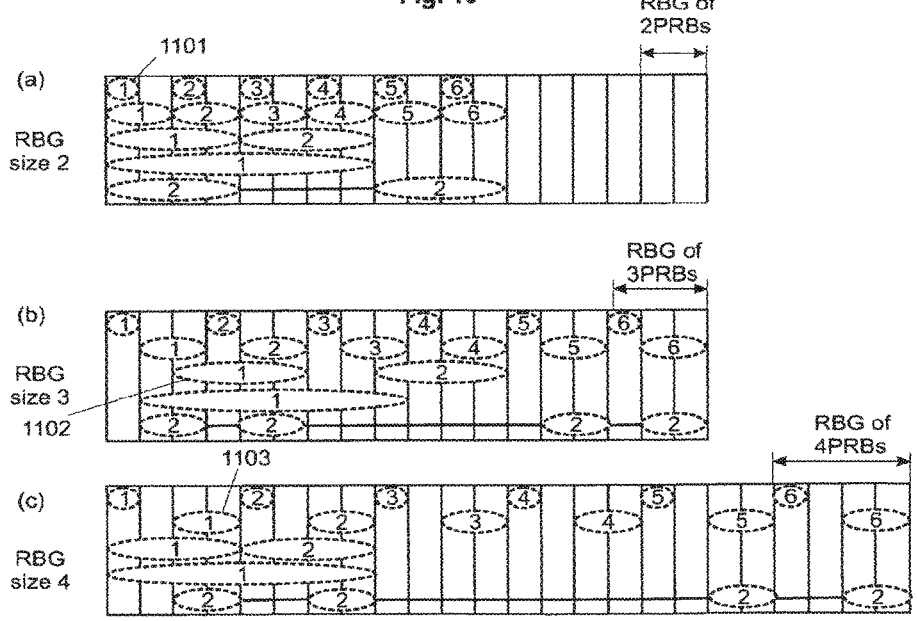
Figure 12:
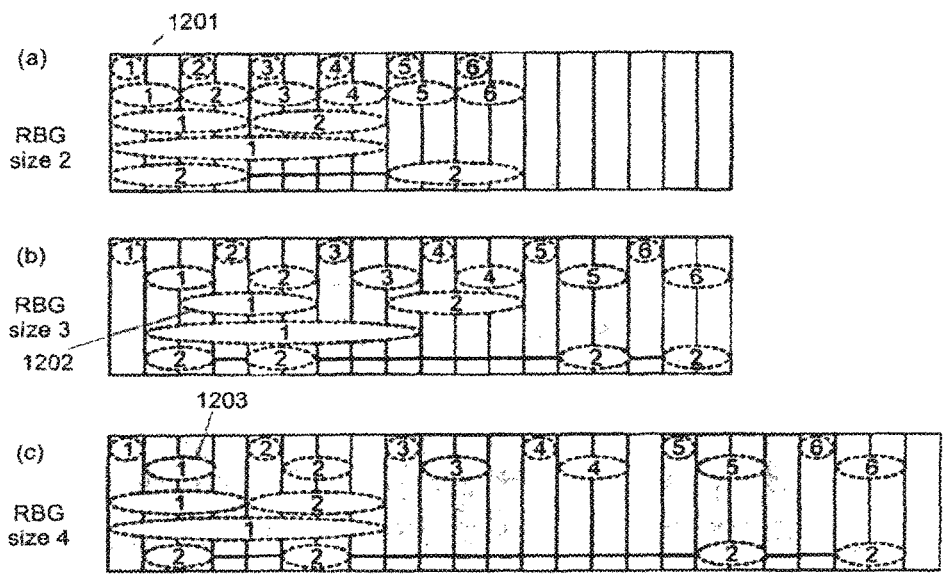
Figure 13:
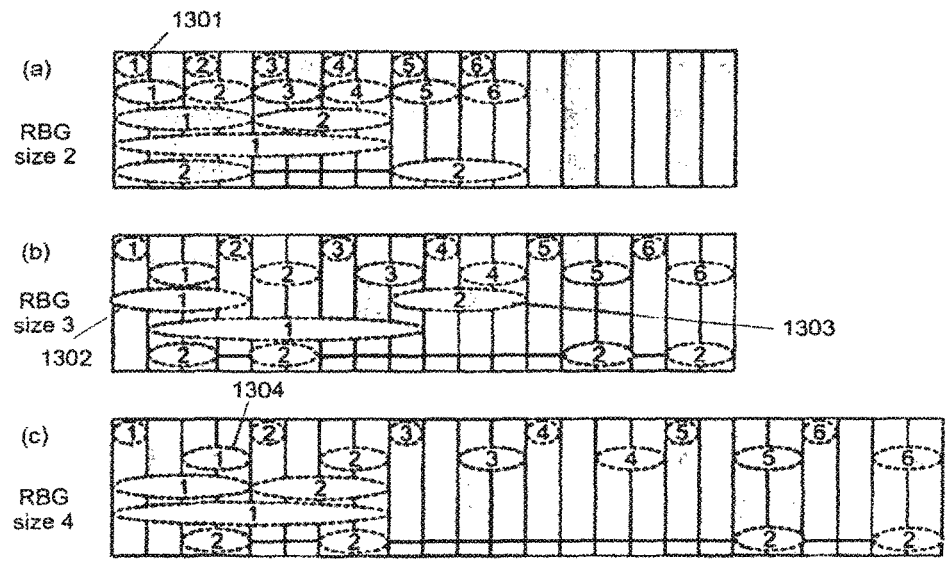
Figure 14:
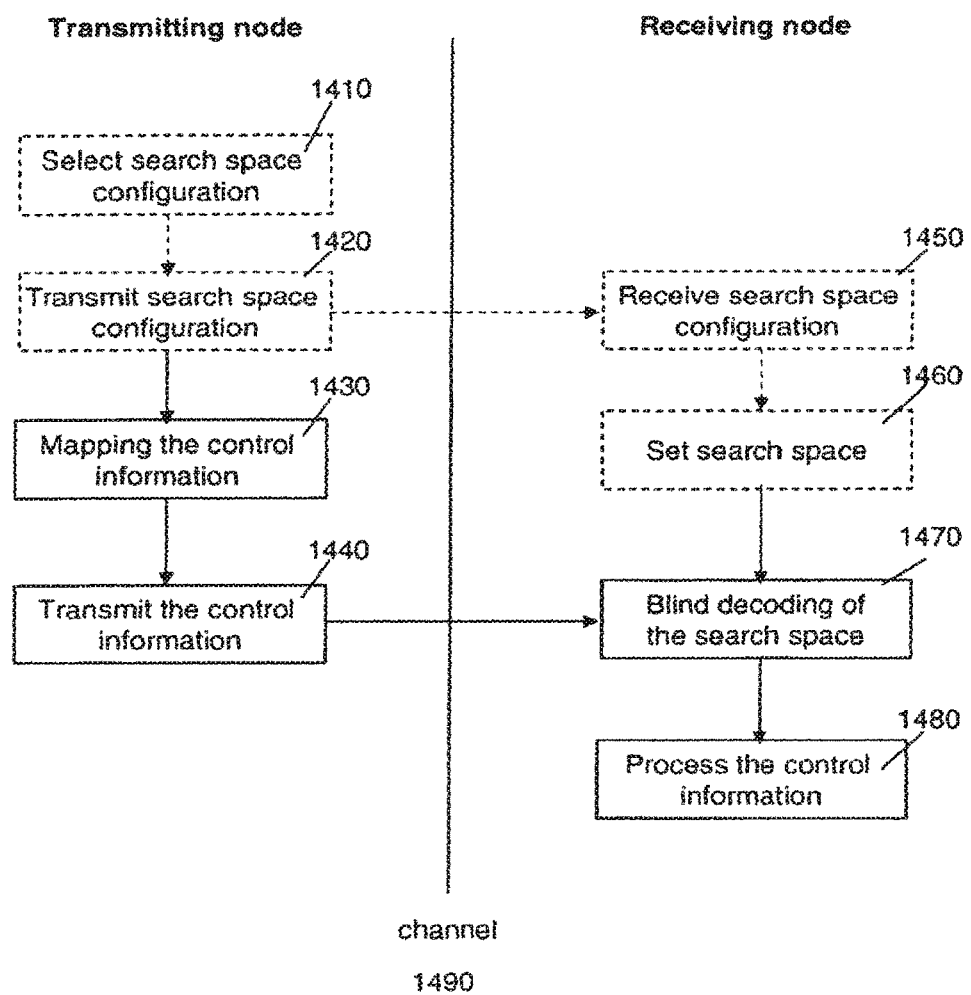

FIG. 10 is a schematic drawing illustrating an example of mapping the aggregation level 1, 2 and 4 candidates with resource block groups of size 4 in accordance with an embodiment of the present invention;

FIG. 11 is a schematic drawing illustrating an example of a search space for different sizes of RGB with candidates aligned with the ends of respective RBGs;

FIG. 12 is a schematic drawing illustrating an example of a search space for different sizes of RGB with some candidates shifted, where possible, with respect to the beginning of an RBG;

FIG. 13 is a schematic drawing illustrating an example of a search space for different sizes of RBG with aligning of candidates to the start and to end of the respective group;

FIG. 14 is a flowchart illustrating an operation of a method according to an embodiment of the present invention; and FIG. 15 is a schematic drawing illustrating a network with two relay nodes and a donor eNodeB.

DETAILED DESCRIPTION

The following paragraphs will describe various embodiments of the present invention. For exemplary purposes only, most of the embodiments are outlined in relation to an OFDM downlink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network. The aspects of the invention described herein may be inter alia used for defining the search spaces for uplink and downlink control information (R-PDCCH), mainly carrying assignments and grants for receivers such as relay nodes or UEs in a 3GPP LTE-A (Release 10) communication systems and for providing an effective resource utilization in terms of R-PDCCH data being mapped to a downlink search space (in particular to individual resource blocks and resource block groups thereof). The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network. Specifically, it can be applied to the communication between two non-mobile nodes of a communication network, such as between a stationary eNodeB and a stationary relay node.

In general, the present invention provides a search space configuration with localized lower aggregation level candidates and at least one distributed candidate of a higher aggregation level.

In particular, the channel structure for carrying control information for at least one receiving node within a sub-frame of a communication system is as follows. The search space within a sub-frame is formed by a plurality of control channel elements. The search space is logically subdivided into candidates for blind decoding by the at least one receiving node. Each candidate includes one or more aggregated control channel elements, wherein at least one candidate has a first number of aggregated control channel elements and these control channel elements are transmitted adjacently or very closely to each other in the frequency domain. Another at least one candidate has a second number of aggregated control channel elements, greater than the first number, and consists of control channel elements at least partially distributed in frequency, where the level of distribution is preferably in the order of more than two transmission units in the frequency domain. The transmission unit is, for instance, a PRB or a control channel element. The distribution level here means the distance between two candidate portions.

Such a search space is particularly advantageous for communication systems in which the quality of channel may vary rapidly and in which the signal may suffer from sudden fading dips, or where the channel is selective in the frequency domain but the knowledge about the channel is inaccurate. This is especially the case for wireless systems with mobile and/or static nodes using multiple carriers. An example therefor is a 3GPP LTE based system and the present invention may readily be employed in such a system. However, the present invention is not limited to such kinds of systems and may be used in any communication system with multiple carriers to configure a search space for any information to be blindly decoded. The information to be blindly decoded is typically control information which enables a node to access further shared or dedicated control resources.

In these terms, the receiving node may be any node capable of receiving control information in such a multi-carrier communication system. For instance, the receiving node may be a user terminal which may be mobile or fixed. Such a user terminal may, but does not necessarily, work as a relay node for other terminals. Alternatively, the receiving node may be a separate relay node. Such a relay node may be fixed (for instance in order to increase a coverage of a base station) or it may be mobile. However, the receiving node may also be any other node such as a base station or other network node. Similarly, the transmitting node may be any network node, for instance, a base station, or a relay node, or a user terminal. In the context of LTE, in an advantageous embodiment of the present invention, the transmitting node is an eNodeB, in particular, a donor eNodeB and the receiving terminal is a relay node. This embodiment is particularly advantageous since the search space for R-PDCCH has not been standardized so far. However, in another embodiment of the present invention the transmitting node may be a relay node and the receiving node may be a user equipment or vice versa. Both transmitting and receiving nodes may also be relay nodes or user terminals.

Regarding the control information, this may be any control information directed to the receiving node. In particular, the control information may indicate the location of further resources, dedicated or shared, for the transmission or reception of data by the receiving terminal. In particular, the control information may include downlink or uplink grants. Alternatively, it can contain commands for power control, or for triggering certain receiver actions such as emission of channel sounding signals, or the deactivation of a communication channel or service.

Figure 1:
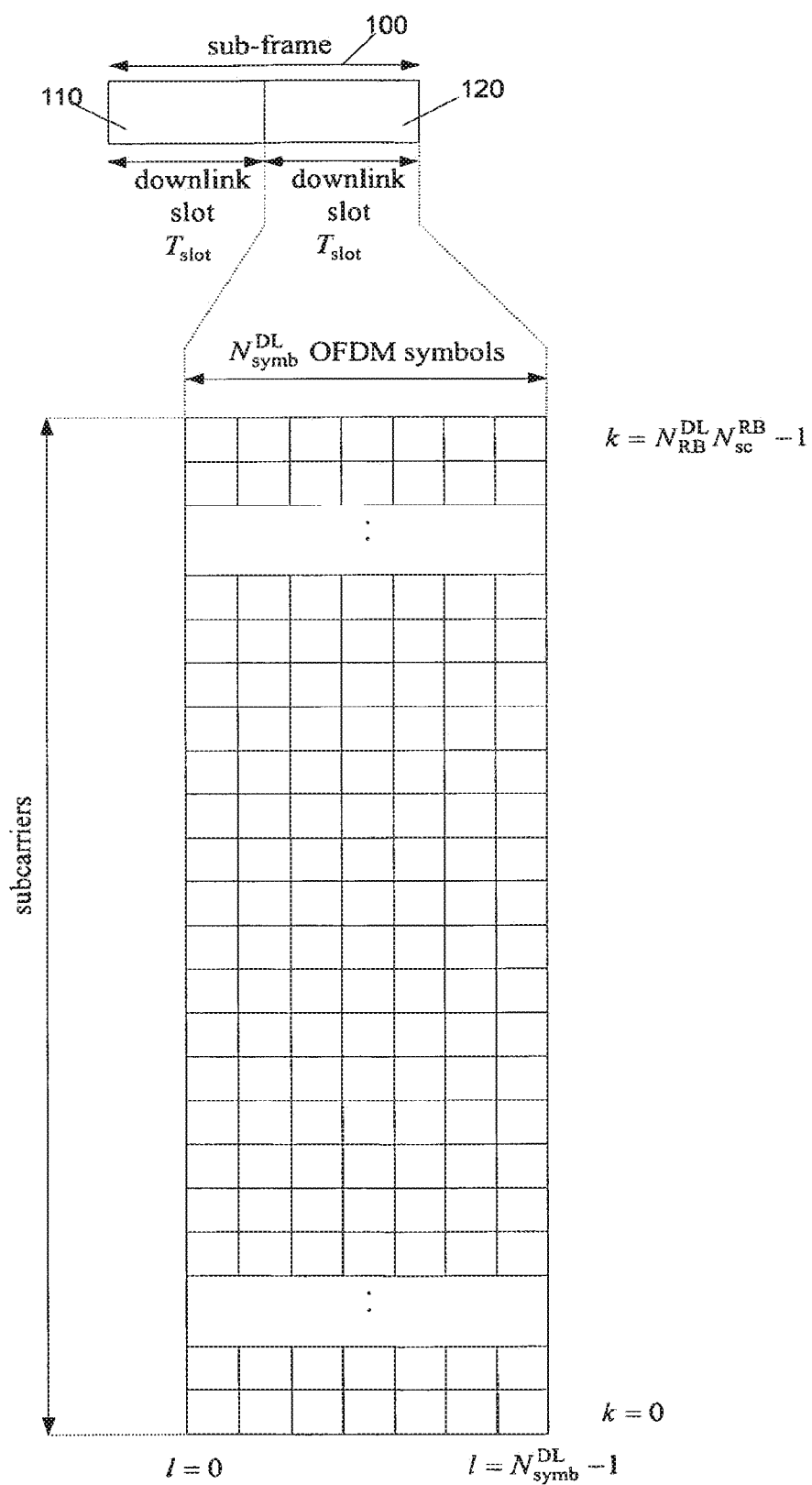
FIG. 1 is a schematic drawing showing the general structure of a sub-frame on a downlink component carrier defined for 3GPP LTE release 8.
Figure 2:
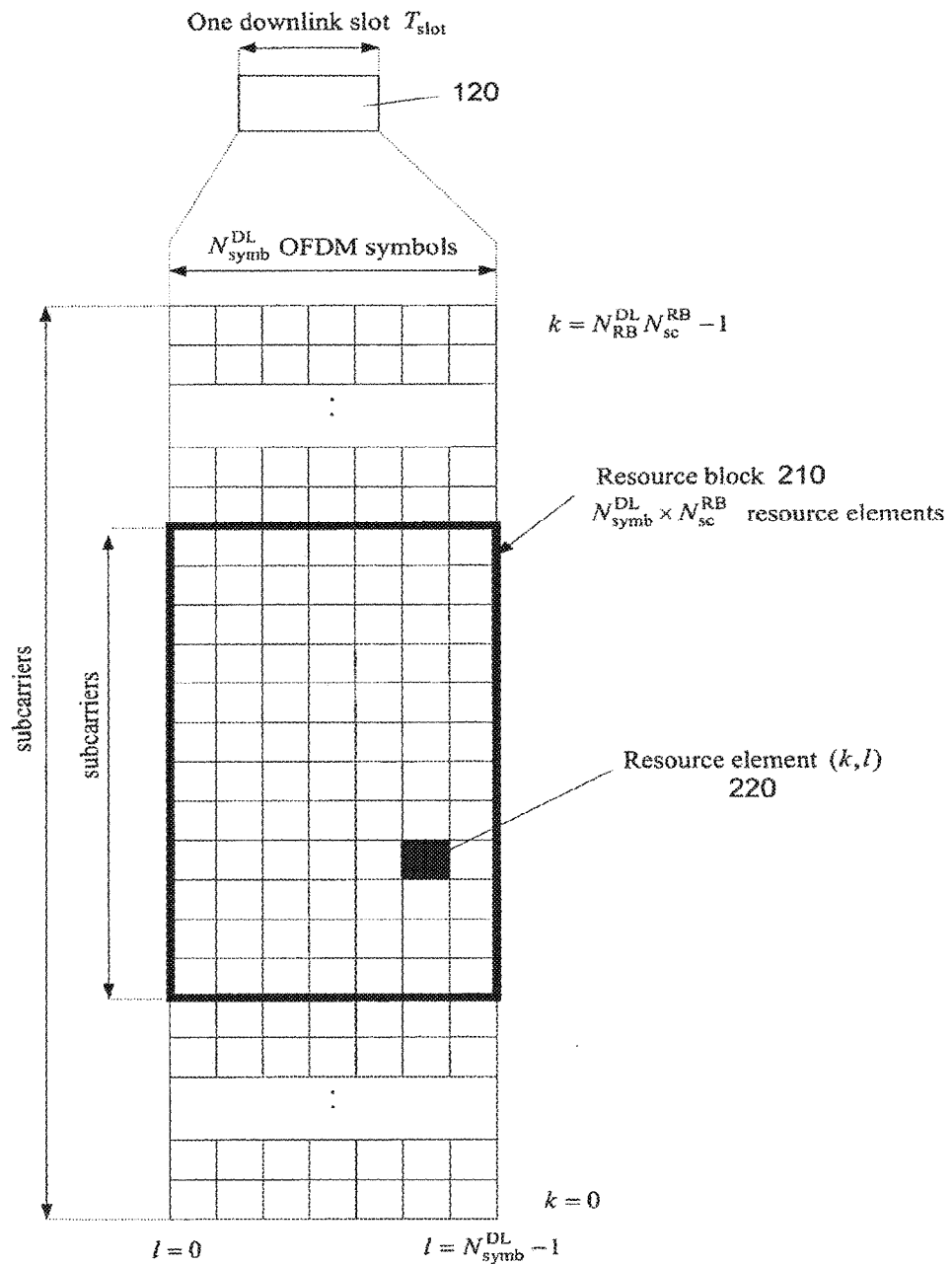
FIG. 2 is a schematic drawing showing an exemplary downlink component carrier of one of two downlink slots of a sub-frame defined for 3GPP LTE release 8.
Figure 3:
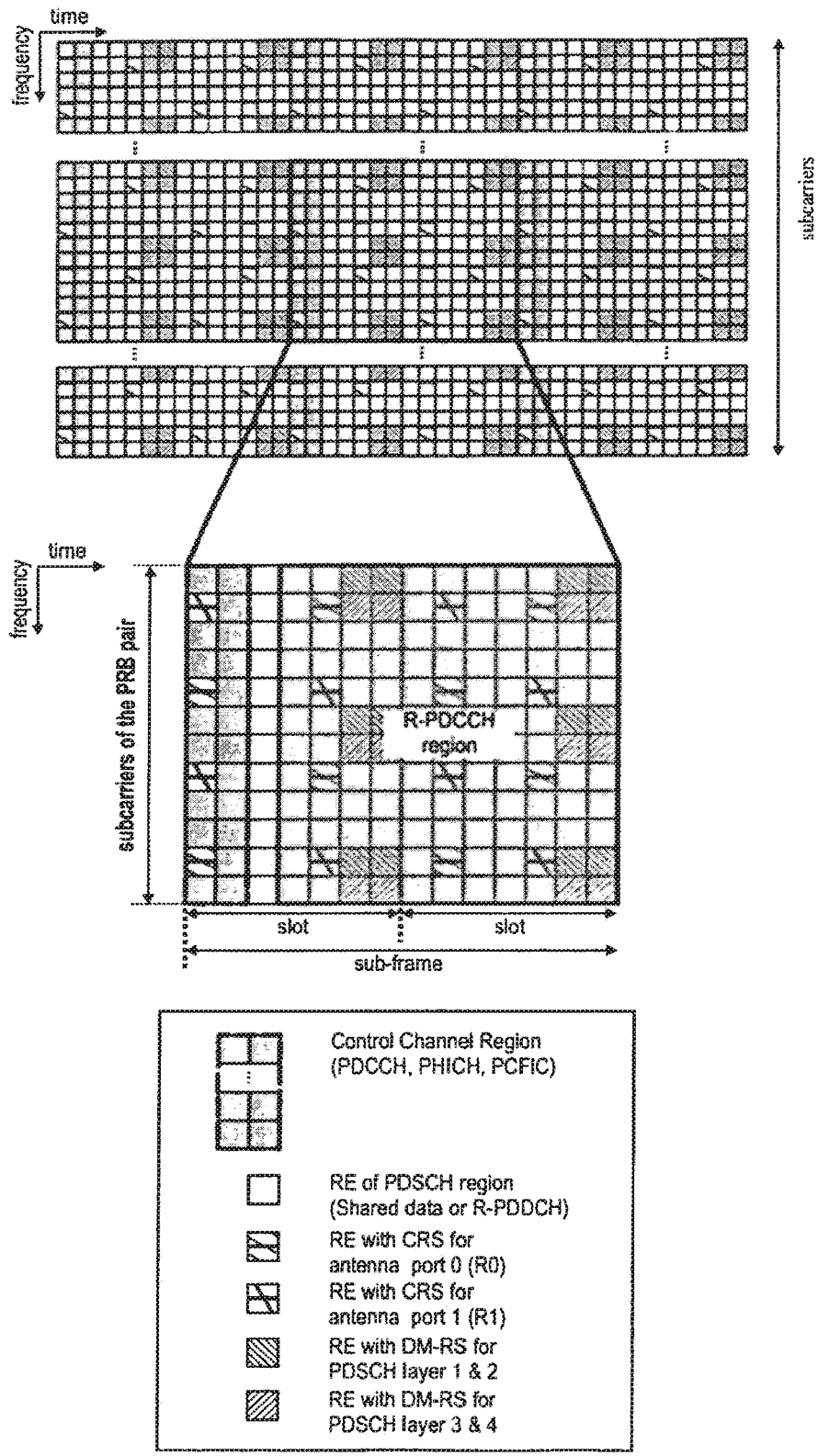
FIG. 3 is a schematic drawing illustrating the structure of a non-MBSFN sub-frames and a physical resource block pair thereof defined for 3GPP LTE release 8 and 3GPP LTE-a release 10.
Figure 4:
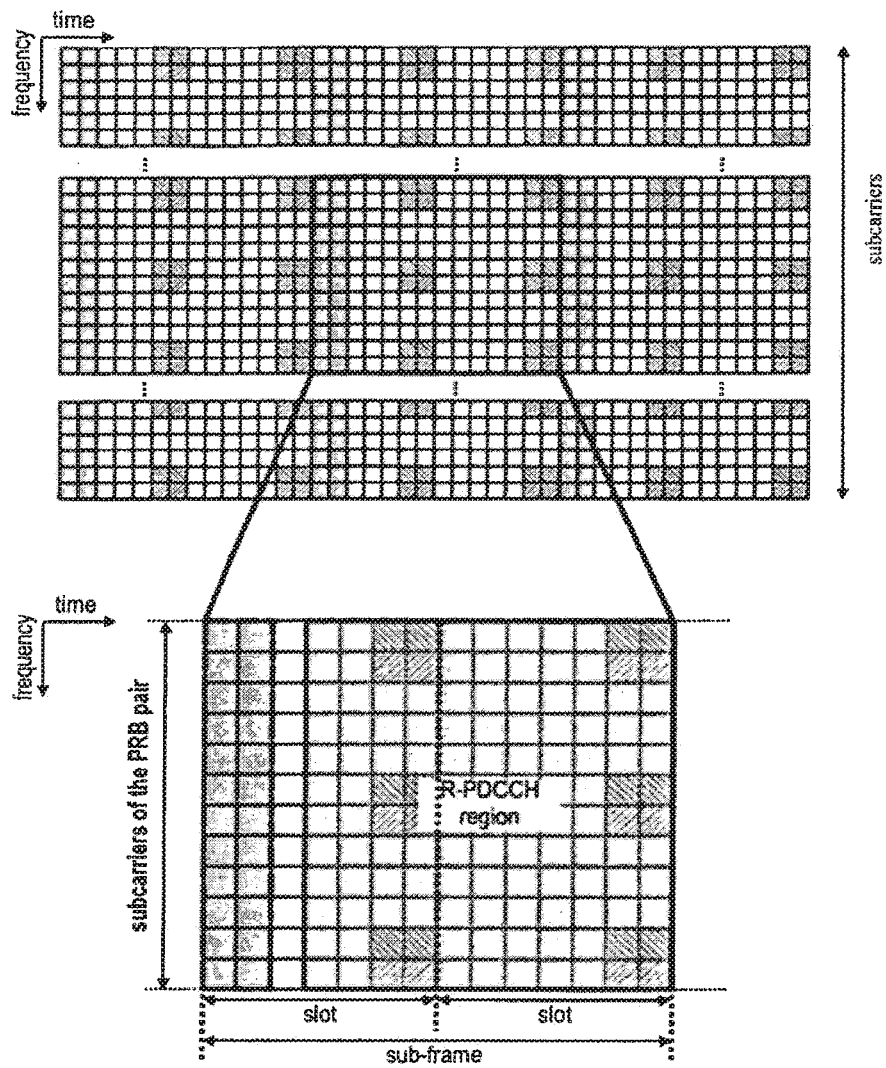
FIG. 4 is a schematic drawing illustrating a structure of MBSFN sub-frames and a physical resource block pair thereof defined for 3GPP LTE Release 8 and 3GPP LTE-A Release 10.
Figure 4:
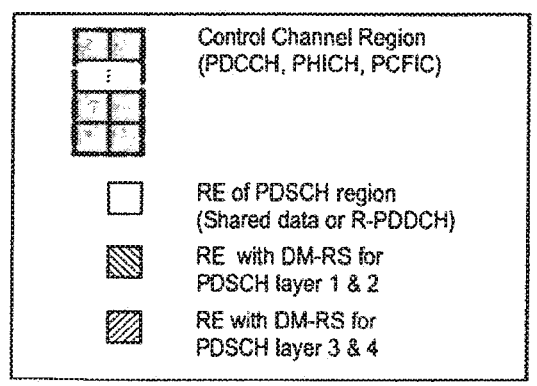
Figure 5:
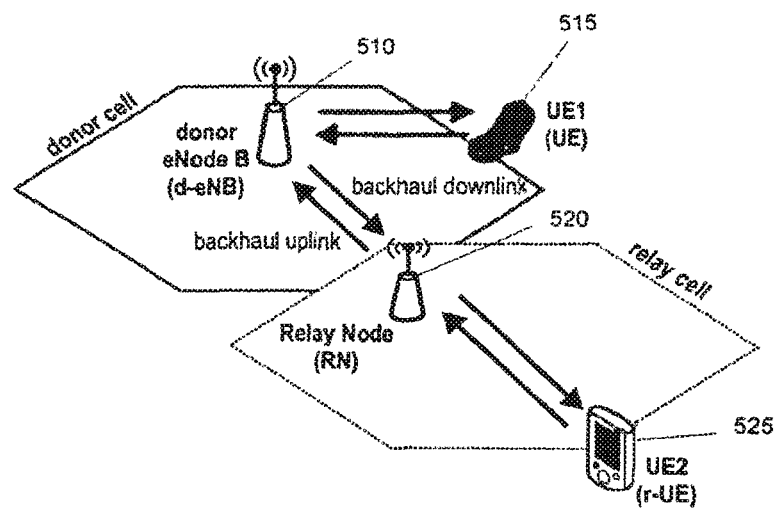
FIG. 5 is a schematic drawing of an exemplary network configuration including a donor eNodeB, a relay node, and two user equipments.
Figure 6:
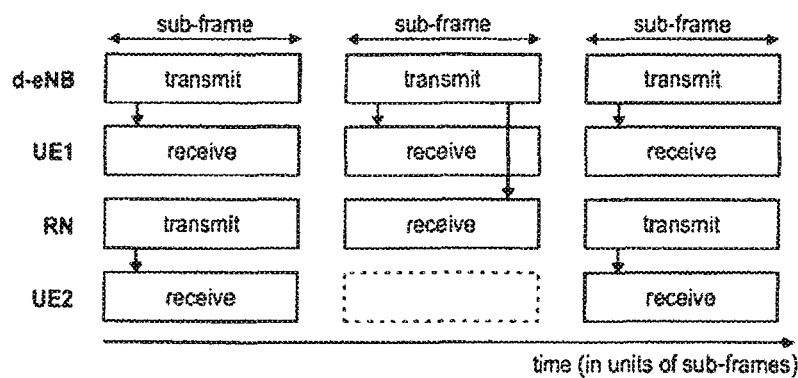
FIG. 6 is a schematic drawing illustrating exemplary behavior of the donor eNodeB, the relay node and the two user equipments of FIG. 3 with respect to the operation in transmission mode and reception mode.
Figure 7:
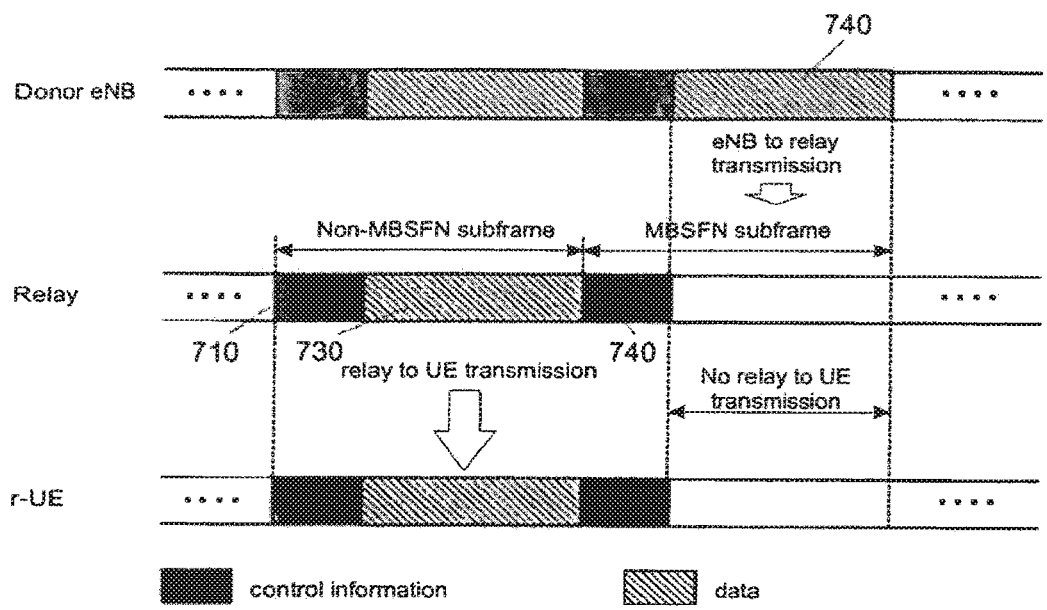
FIG. 7 is a schematic drawing illustrating an example of a structure of a relay backhaul downlink sub-frame configurations used in 3GPP LTE-A Release 10.

In general, the search space consists of candidates for blind decoding. Candidates are in this context subsets of physical system resources. The basic resource element for transmission of the control information is the control channel element. Each candidate may include one control channel element or more aggregated control channel elements. The control channel elements may correspond to a particular frequency range (one or more carriers of the multi-carrier system) and have a predefined time duration. Here, the control channel element represents a smallest physical resource portion which is addressable for the transmission of the control information. In context of LTE, the control channel element may be, for instance, a CCE or a physical resource block, with the possible exception of resource elements that are occupied by indispensable signals such as reference symbols, as is exemplarily shown in FIG. 3 by the resource elements carrying common reference symbols (CRS) or demodulation reference symbols (DM-RS). It can further comprise only a subset of OFDM symbols within a slot as shown in FIG. 4, where only the second part of the first slot is usable for carrying control channel elements.

The search space according to the present invention is configured to include both localized and distributed candidates. Localized candidates are candidates the control channel elements of which are located in a sequence adjacently to each other in frequency domain. Distributed candidates are not localized, meaning that their control channel elements are located in the frequency domain separated from each other by at least one control channel element not belonging to the same candidate. The control channel elements of the candidate may be distributed over single non-adjacent control channel elements (separated from each other in frequency by at least one physical resource block). A candidate may also be distributed partially, which means that the candidate is subdivided into portions of more than one adjacent control channel elements, and the portions are further distributed in frequency. The portions may, but do not need to have, the same size.

Global deployment of mobile communication systems brought a requirement of providing a widest possible coverage and to support terminals with high mobility. To facilitate this, the concept of relay nodes has been standardized. Relay nodes working in a frequency band common for access link (link to and from a terminal) and relay (backhaul) link (link to and from a network node such as an eNodeB) provide advantages including reduced costs and can be more easily deployed. However, as described above, such relay nodes typically work in a time division mode, meaning that they cannot exchange data at the same time on relay access and backhaul link. Consequently, the relay node resources have to be shared for transmitting and/or receiving of data to/from a network node and to/from a terminal.

According to an exemplary embodiment of the present invention, a search space is provided for channel carrying resource assignments, in particular, signaling of resource assignments on and for the backhaul link. The search space includes physical resources defined in terms of time and frequency resources, which carry uplink and/or downlink grants and which are typically received by a relay node from a network node. Configuration of such a search space is advantageously reconfigurable, meaning that the position of the search space may be set and signaled from the network node to the relay node. In order to maintain the system efficient, such a signaling should preferably require as low bandwidth as possible.

In 3GPP LTE, the resources may be allocated in terms of physical resource blocks (PRB). Some control channels allow for assigning even smaller resource portions. For instance, the PDCCH control channel region within a subframe consists of a set of control channel elements (CCEs). A PDCCH can aggregate 1, 2, 4 or 8 CCEs. Similarly, R-PDCCH shall likely support aggregation levels 1, 2, 4, and 8. The aggregation may be over CCEs or over physical resource blocks. In the following, examples are described with aggregation of the physical resource blocks. However, all these examples are applicable also to aggregation of CCEs as a unit of physical resources.

Each relay node monitors a set of R-PDCCH candidates of any aggregation levels for control information in every non-DRX subframe. Monitoring refers to attempting to decode each of the R-PDCCHs in the set according to all monitored formats, i.e. blind decoding. Blind decoding is described for UE receiving a PDCCH in 3GPP TS 36.213 "Evolved Universal terrestrial Radio Access (E-UTRA); Physical layer procedures", v8.8.0, September 2009, Section 9.1.1, freely available at http://www.3gpp.org/and incorporated herein by reference). According to the present specifications for UE-specific PDCCH, the search space may include six candidates of aggregation level 1 and 2 and two candidates of aggregation levels 4 and 8. The number of candidates also specifies the number of blind decodings the terminal has to perform.

Figure 8:
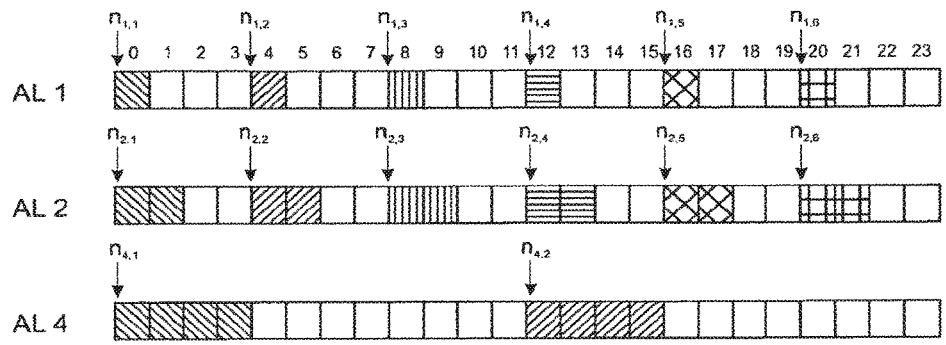
FIG. 8 is a schematic drawing illustrating an example of a localized search space for uplink and downlink grants with candidates of various aggregation levels.

FIG. 8 illustrates an example of a localized search space configuration for R-PDCCH assuming a similar configuration.

Accordingly, an R-PDCCH search space of R-PDCCH aggregation level L is configured by a set of virtual resource block (VRB) indices $\{n_{L,1}, n_{L,2}, \ldots, n_{L,M(L)}\}$ and the R-PDCCH resource allocation type (distributed or localized VRB mapping). The configuration may be signaled, for instance, by RRC signaling. The same configuration may be applicable to both first and second slot, carrying the downlink and uplink grants, respectively. For such a localized search space, the index of VRB equals to the index of PRB. Therefore, L consecutive PRBs constitute a valid R-PDCCH candidate. The starting positions of each candidate for each aggregation level are signaled from a donor eNodeB to a relay node. Similarly to PDCCH configuration (cf., for instance, 3GPP TS 36.213 "Evolved Universal terrestrial Radio Access (E-UTRA); Physical layer procedures", v8.8.0, September 2009, Section 9.1, available on http://www.3gpp.org/, and incorporated herein by reference), FIG. 8 assumes six candidates for aggregation level 1 and 2, and two candidates for aggregation level 4. The index of the candidate for each aggregation level is also illustrated by a different hatching.

Figure 9:
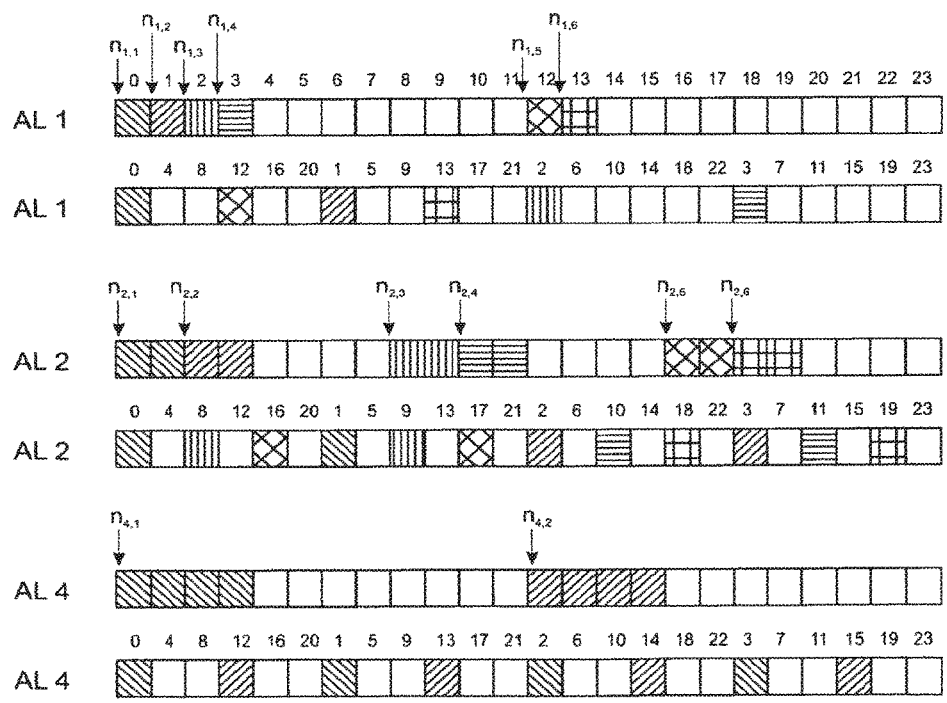
FIG. 9 is a schematic drawing illustrating an example of a distributed search space for uplink and downlink grants with candidates of various aggregation levels, and the relation between virtual resource blocks and physical resource blocks in a distributed mapping case.

FIG. 9 illustrates an example of distributed search space configuration for R-PDCCH assuming that the VRB to PRB mapping follows the rules of Release 8 DVRB mapping, where for each aggregation level (AL) the upper row denotes the VRB, while the lower row denotes the corresponding PRB.

In the localized search space as shown in FIG. 8, adjacent PRBs are aggregated. However, such a localization is detrimental in case that the PRBs are in a fading dip or in case when the interference increases substantially especially for higher aggregation levels, or if the knowledge of the channel at the transmitting node is inaccurate. This is because the higher aggregation levels, such as aggregation level 4 and 8, only have two candidates for each aggregation level. These candidates are more affected by a bad channel condition since the probability that all candidates are facing a bad channel condition is higher. Thus, the relay node may even loose connection to the donor eNodeB, which, on the other hand, may result in terminals attached to the relay node losing their connection to the network. Since in case of only a localized search space, all candidates of different aggregation levels are mapped in localized way, the robustness with respect to fading dip or channel knowledge inaccuracy is reduced especially for higher aggregation levels, such as aggregation level 4 or 8.

Furthermore, as can be seen in FIG. 8, the starting positions of candidates for aggregation levels 1, 2 and 4 overlap. It means that if PRB#0 is used for R-PDCCH of aggregation level 1, PRB#0 and #1 cannot be used for R-PDCCH of aggregation level 2 for another relay node. In general, in case of non-interleaved R-PDCCH using CRS for demodulation, it is better to allocate R-PDCCHs within one resource block group (RBG) in order to reduce the number of RBGs that are occupied by R-PDCCHs. However, due to overlapping of candidates of different aggregation levels, multiple R-PDCCHs cannot be efficiently allocated in one RBG in order to reduce the number of RBGs occupied by R-PDCCHs in case of CRS non-interleaved R-PDCCH.

In order to provide higher robustness against fading or channel knowledge inaccuracy, according to the present invention, in case of configured localized search space, at least part of the candidates for blind decoding for the larger (largest) aggregation size is distributed over the candidates of lower level aggregation size. The lower level aggregation sizes are preferably level 1 and/or 2. The distribution may be performed for levels 1 and/or 2. For some systems, in which another sizes of candidates are enabled, the distribution may be performed over any aggregation level candidate such as 3 or 4 or 5, etc.

In its last three lines, FIG. 10 illustrates an example of mapping for candidates of aggregation level 4 (denoted as AL4). Accordingly, the first two aggregation level-4 candidates are localized in the frequency domain and are mapped to resource block group #1 and resource block group #4. The third candidate 1040 is distributed over candidates of aggregation level 1. In this case, the candidate number 3 is distributed into the first physical resource block of the respective resource block groups #1, #2, #4 and #6. The fourth candidate 1030 is distributed over candidates of aggregation level 2. In particular, the fourth candidate is located at the end of the resource block group #1 and the resource block group #5 in portions of two physical resource blocks. Thus, the search space of FIG. 10 includes a distributed part of the search space 1020 formed by the third and fourth candidates with aggregation level four. The search space further includes a localized part of 1010 formed by the first and the second candidates with aggregation level four, by six candidates of aggregation level 2 and by another 6 candidates of aggregation level 1.

It should be noted that the way of distributing the third and the fourth candidates in FIG. 10 is only an example. The third level-4 candidate may alternatively be distributed over other level-1 candidates, for instance, over the first physical resource blocks of RBG#3 or RBG#3.

Alternatively, the distribution does not necessarily have to be performed over lower aggregation level candidates. In general, the third level-4 candidate may be distributed over any physical resource blocks (control channel elements) of the RBGs, or even be irrespective of the RBG definition. The distribution of higher level candidates provides higher robustness with respect to frequency selective fading. Therefore, it is particularly advantageous to distribute the higher level candidates to physical resource blocks possibly distanced from each other.

Similarly, the 2-PRB large portions of fourth level-4 candidate in FIG. 10 may be distributed in to any of the six RBGs. In particular, the portions may be placed in RBG#1 and RBG#6, or to RBG#2 and RBG#6, or to any other RBG# combinations. However, the more distanced the portions are from each other, the higher the probability that at least one of them is not in fading. It is also advantageous to map different candidates of the same aggregation level and for the same receiving node on possibly different frequencies. The fourth level-4 candidate also does not need to be mapped over level-2 candidate positions. A similar effect may be achieved by mapping its portions to the second and third physical resource block of the respective groups. The portions may also be mapped to the first two physical resource blocks.

Thus, FIG. 10 illustrates an example of a search space with localized lower aggregation level candidates (level-1, level-2 candidates), and with higher aggregation level candidates (level-4) localized and distributed. However, the present invention is not limited thereto and, alternatively, all higher aggregation level candidates may be distributed. Alternatively, a single localizes and three distributed level-4 candidates may be employed or vice versa.

The particular configuration of the search space should advantageously be designed with regard to the particular deployment scenario such as the expected or assumed channel characteristics, which can further depend on channel state feedback from the receiver. The channel characteristics shall depend on whether the transmitting/receiving nodes are mobile or static, their distance and location, etc. It shall further depend on the frequency band used. For different deployment scenarios and systems, other particular configuration may be more suitable as shall be understood by a person skilled in the art.

The present invention provides a configuration of a search space for blind decoding of control information. In accordance with an embodiment of the present invention, such a search space is fixedly defined in the specification of the communication system. According to another embodiment of the present invention, the search space is configurable statically and may be received within system information on broadcast control channel(s) of the communication system. In accordance with still another embodiment of the present invention, the search space configuration may be semi-statically set with higher layer signaling, such as Radio Resource Control (RRC) protocol signaling in 3GPP LTE. Alternatively, the search space may be configured dynamically for sub-frames.

Apart of the distribution of some higher aggregation level candidates, FIG. 10 also shows localized mapping of lower aggregation level candidates in accordance with another advantageous embodiment of the present invention. Accordingly, the overlapping of candidates of different aggregation levels is avoided. This is illustrated in FIG. 10 for aggregation levels 1 (denoted AL1) and 2 (denotes AL2). In particular, the exemplary 6 candidates of aggregation level 1 are placed in the first physical resource block of each resource block group which means in physical resource blocks 0, 4, 8, 12, 16 and 20. The exemplary 6 candidates of aggregation level 2 are also placed in each resource block group. However, in order to avoid overlapping with the candidates of aggregation level 1, the candidates of aggregation level 2 are mapped on the last two physical resource blocks of each resource block group. This mapping of aggregation level 1 and aggregation level 2 candidates on resource block groups provides a more efficient and more flexible possibility of defining a search space. In contrast to the example described with reference to FIG. 8, the candidates in FIG. 10 of aggregation level 2 and aggregation level 1, mapped to the same resource block group, may be still assigned to different receiving nodes (for instance relay nodes).

The entire example of FIG. 10 illustrates a search space which is both localized and distributed. In particular, aggregation level candidates 1 and 2 are localized and aggregation level 4 candidates are distributed and localized. It should be noted that FIG. 10 only exemplifies the possibilities of distributing aggregation level 4 candidates. Other combinations are possible, for instance, all aggregation level 4 candidates may be distributed to single physical resource blocks or portions of a plurality of resource blocks. Alternatively, there may be only two aggregation level 4 candidates, only one of which is distributed, for instance, over candidates of aggregation level 2.

In FIG. 10 the candidates of different aggregation levels are mapped onto the same resource block group with as little overlapping as possible. In context of the 3GPP LTE backhaul link, the R-PDCCH candidates of aggregation level 1 and 2 are mapped onto different physical resource blocks within one resource block group. In this example resource block group size is equal to 4 physical resource blocks. R-PDCCH of aggregation level 1 can be multiplexed with R-PDCCH of aggregation level 2 within one resource block group. This is useful in particular when multiple relay nodes share the same search space and CRS non-interleaved R-PDCCH is configured for these relay nodes.

The search space according to this embodiment of the present invention provides several benefits. This concept allows for dynamic switching between localized and distributed aggregation in which the candidates of higher aggregation level are distributed whereas the candidates of lower aggregation levels are localized. This helps to avoid losing connection in case of sudden deteriorations of the channel and prevents a receiver to fall-back to an initial attachment procedure, for example by being able to re-configure the search space to occupy different physical resource blocks, or to change to a distributed mode method such as shown in FIG. 8, leading to an improved efficiency of backhaul link and to a better service for terminals attached to the relay nodes. Moreover, the robustness of aggregation level 4 and 8 candidates is increased. This is important in particular in schemes in which there is lower number of higher aggregation level candidates since in such a case the probability of such candidates to being in a fading dip is rather high. In addition, avoiding of overlapping between candidates of different aggregation levels prevent blocking among blind decoding candidates of localized lower aggregation sizes and provides more efficient mapping of the control channel on physical resources. The above described search space configurations also maintain the property of minimizing the number of resource block groups occupied by search space and R-PDCCH allocation, since it compactly maps the candidates of different aggregation levels on the same resource block groups.

FIGS. 11, 12, 13, show examples for illustration of candidates, the control channel elements of which they are composed by means of aggregation, and their locations with respect to physical resource blocks and RBG sizes. Generally, the first line shows candidates of aggregation level 1, under that the candidates for aggregation level 2, under that the candidates for aggregation level 4, followed by two lines for aggregation level 8. The different RBGs are illustrated by alternating white and gray background.

FIG. 11 illustrates further examples of implementing the present invention for different sizes on the resource block group. In particular, FIG. 11, part (a) shows an example in which the resource block group size is equal to 2 physical resource blocks and candidates of aggregation levels 1, 2, 4 and 8 are mapped thereto. The candidates of aggregation level 1 (such as, for instance, the first candidate 1101) are mapped onto each first physical resource block in each group. There are 6 aggregation level 1 candidates. The 6 aggregation level 2 candidates are also mapped to each of the resource block groups so that they indeed overlap with the candidates of aggregation level 1. However, a compact mapping which requires only 6 resource block groups can be achieved. In context of LTE, the configurable number of PRBs for RBG with size 2 is between 11 and 26 PRBs. For RBG of size 3, there are 27 to 63 PRBs. For RBG of size 4, there are 64 to 110 PRBs. More details to the possible configurations can be found in 3GPP TS 36.213 "Evolved Universal terrestrial Radio Access (E-UTRA); Physical layer procedures", v8.8.0, September 2009, Section 7.1.6.1, as already mentioned above.

The two candidates of aggregation level 4 are mapped onto the first 4 resource block groups each candidate covering two resource block groups. Finally, the two candidates of aggregation level 8 are mapped as follows: the first one in a localized manner and the second one in a distributed manner. In particular, the first aggregation level 8 candidate covers first 4 resource block groups. The second aggregation level 8 candidate is distributed over portions of 4 physical resource blocks which is in this example a first portion covering the first two resource block groups and a second portion covering the last resource block groups 5 and 6. In FIGS. 11, 12, and 13, the candidates are illustrated as dashed ellipses with the candidate number written therein. The size of the ellipse corresponds to the aggregation level of the candidate for localized candidates. For distributed candidates, the ellipses illustrate the candidate's portions, which are connected with a horizontal line. For example, FIG. 11 (a) shows the second candidate for aggregation level 8 in the bottom row aggregating two portions each of size 4 control channel elements, both portions being distributed by 4 PRBs.

FIG. 11, part (b) illustrates an example in which the size of resource block group is three physical layer blocks. In particular, the candidates of aggregation level 1 are mapped on the first physical resource block of each of the 6 resource block groups. The candidates of aggregation level 2 are mapped to the last two physical resource blocks of each resource block group. As can be seen, with such a mapping, candidates of aggregation level 1 do not overlap with candidates of aggregation level 2. The two candidates of aggregation level 4 are larger than the resource block group itself and are therefore mapped over two neighboring resource groups. In particular, the first aggregation level 4 candidate 1102 is mapped on the last physical resource block of the first resource block group and on all physical resource blocks of the second resource block group. The second candidate of aggregation level 4 is mapped similarly, on the next available resource block groups #3 and #4. The first candidate of aggregation level 8 is localized and mapped similarly to the mapping of level 4 candidates namely by aligning on the end of the first possible resource block group #3. The RBG#3 is the first possible, since the level 8 candidate needs 3 RBGs of size 3 and aligning to the last PRB of the RBG#3 is performed. In this case the first aggregation level 8 candidate is mapped on resource block groups 1, 2 and 3 and aligned to the end of the resource block group 3. The second candidate of aggregation level 8 is distributed. The distribution is performed over aggregation level 2 candidates, in particular, the position of distributed 2-PRBs-long level 8 candidate portions are mapped on positions of the first, the second, the fifth and the sixth aggregation level 2 candidates.

FIG. 11, part (c) is an example of a search space mapped on resource block groups of size 4. Similarly to the previous examples described with reference to parts (a) and (b) of FIG. 11, the candidates of aggregation level 1 are mapped to the first physical resource block in each of resource block groups. The rest the candidates of aggregation level 2 (such as the first candidate 1103) are mapped to the last two physical resource blocks of each resource block group— they end with the past PRB of an RBG. The two candidates of aggregation level 4 are localized and mapped on the first available resource block group which means resource block group #1 and resource block group #2, respectively. One candidate of aggregation level 8 is localized and mapped onto the first available resource block group and aligned to the end of the group. Thus it covers resource block groups #1 and #2. The second candidate of aggregation level 8 is distributed over aggregation level 2 candidates. The distributed 2-PRB large portions of the second candidate are located on two last physical resource blocks of resource block groups #1, #2, #5 and #6.

FIG. 11 thus illustrates an embodiment in which the candidates of aggregation level 1 are located in the first physical resource block of each resource block group. Candidates of aggregation levels higher than aggregation level 1 are aligned with the end of resource block groups. In case the physical resource block group is smaller than the size of the localized candidate (cf. for instance parts (a) and (b) of FIG. 11 for candidates of aggregation level 4), the candidate will cover more than one resource block groups. In such a case, it is aligned to the end of the last of the covered adjacent groups. One candidate of the aggregation level 8 is distributed. The portions of the distributed candidate are also aligned to the end of the resource block groups—the portions are distributed over level 2 candidates.

As already emphasized above in connection with FIG. 10, FIG. 11 only provides an example search space. This example employs 6 candidates of aggregation level 1, 6 candidates of aggregation level 2, and 2 candidates for the respective aggregation levels 4 and 8. This is a typical configuration used, for instance, in LTE. However, the present invention is not limited thereto. The number of candidates per aggregation level may be selected according to the requirements of the system. Moreover, the basic resource which is allocated to a candidate may be a control channel element, which may be smaller than the physical resource block. Then, the aggregation of control channel elements is performed. The present invention may equally be applied to the control channel elements. Moreover, the basic resources (physical resource blocks or control channel elements) do not necessarily have to be grouped to groups of physical resource blocks or to corresponding groups of control channel elements. The particular approach of the present invention, namely, control space with centralized lower aggregation level candidates and distributed higher level candidates, is applicable irrespectively of any such grouping of resources. Similarly, the arrangements for reducing the overlapping between the candidates of different levels may be applied without any underlying resource block grouping.

FIG. 12 shows an alternative embodiment of the present invention for RBG sizes 2 (a), 3 (b) and 4 (c). Accordingly, the candidates of aggregation level 1 (such as the first candidate when RBG size 2 is employed 1201) are mapped similarly to the example described with reference to FIG. 11, namely they are mapped on the first physical resource block of each resource block group. The candidates of aggregation level 2 are mapped starting from the physical resource block following the physical resource blocks to which aggregation level 1 candidates were mapped, if possible (cf. in case of RBG size 4, the first candidate of level 2, 1203). This also corresponds to a shift of one PRB from the start of the RBG. In this example, the candidates of aggregation level 4 are mapped similarly as in the previous examples namely by aligning their ends to the ends of the respective resource block groups (cf. the first candidate of level 4, 1202). In FIG. 12, a shift of 1 PRB is illustrated. However, the present invention is not limited thereto and the candidates of higher aggregation levels may also be shifted by two or more physical resource blocks from the start of the resource block group or with respect to candidates of another aggregation level.

Such a search space does not differ from the search space described with reference to the example of FIG. 11 for RBG of size 2 and 3. However, a difference can be seen for candidates of aggregation level 2 in resource block groups of size 4 (part (c) of the figure). The shift may be defined with respect to the start of the RBG. Alternatively, the shift may be defined with respect to candidates of other aggregation level, for instance, with respect to the closest lower aggregation level.

Another embodiment relates to a search space in accordance with the present invention as illustrated in FIG. 13. Accordingly, the two aggregation level 4 candidates are aligned differently: the first level-4 candidate 1302 is aligned with the first PRB of an RBG and the second candidate 1303 is aligned with the last available PRB of an RBG. This configuration enables the balancing of the number of blocked level 1 and level 2 candidates. In particular, FIG. 13 shows candidates of the aggregation level 1 (cf. the first candidate of level 1, 1301) mapped to the first physical resource block of each resource block group and candidates of aggregation level 2 (cf. the first candidate of level 2, 1304) mapped to the last two resource blocks of each resource block groups as in previous examples. The different candidates of the same higher aggregation level may be aligned differently. Apart of the alignments to the start and to the end of the resource block groups, shift defined with respect to the start or end of the RBG may be applied. Alternatively, a shift with respect to candidates of other aggregation level may be applied. The shift may differ for candidates of the same aggregation level.

The examples described with reference to FIGS. 11, 12 and 13 showed a case in which one higher aggregation level candidate is localized and one candidate of the same level is distributed. The illustrated localized and distributed aggregation level was level 8. However, the present invention is not limited thereto. More than one distributed candidate may be supported for a larger aggregation level in order to better support multiple relay nodes (receiving nodes) sharing the same search space resources. Moreover, any candidates of aggregation level 4 may also be distributed. FIGS. 11, 12 and 13 showed mapping of level-1 candidates always on the first control channel element/resource block in an RBG. However, the level-1 candidates may also be mapped to the last control channel element/resource block in an RBG. In such a case, the level-2 candidates may start with the first PRB in an RBG.

Regarding the support of multiple relay nodes, according to another embodiment of the present invention the positions of distributed higher aggregation level candidates of one receiving node are different from (in particular, orthogonal to) positions of distributed candidates of the same level of another receiving node. This may be performed, for instance, depending on a receiving node ID.

For example, according to 3GPP LTE Release 8 (and later releases), a UE is identified during regular operation by a so-called C-RNTI, which is basically a value represented by 16 bits. Accordingly, it can be assumed that a relay node ID, or generally a receiver ID, in the present invention can be identified by a similar or same identifier. In one simple example, one or more of the bits of such an identifier determine whether and/or how much the position of the higher aggregation level candidate(s) are shifted, in terms of physical resource blocks. For example, the least significant bit of the relay node ID is used whether such candidate(s) are shifted (bit equals 1) or not (bit equals 0) by one physical resource block.

Preferably, the highest aggregation level is distributed in such a way. Advantageously, the positions of localized candidates with a lower number of aggregated physical resource blocks are identical for a first receiving node and a second receiving node. For instance, the aggregation level 1 and 2 candidates may be mapped onto the same positions for a plurality of receiving nodes while the 4 and/or 8 aggregation level candidates are distributed orthogonally, meaning that their positions differ.

In order to reduce the blocking of lower aggregation level by a higher aggregation level and vice versa, in accordance with another embodiment of the present invention, the candidates of higher aggregation levels are consisting of control channel elements, where the position of at least a first control channel element is identical to the position of a control channel element of a candidate of a first lower aggregation level, and where the position of at least a second control channel element is identical to the position of a control channel element of a candidate of a second lower aggregation level, where the first lower aggregation level size is different from the second lower aggregation level size, and both are smaller than the aggregation level size of the higher aggregation level. For instance, the candidate of higher aggregation level is of AL 8, a first control channel element of this candidate is mapped to the position of a candidate of aggregation level 1 and the position of a second control channel element of this candidate is mapped to the position of any of control channel elements of a candidate of aggregation level 2. In a further example, the candidate of higher aggregation level is of AL 8, a first control channel element of this candidate is mapped to the position of one candidate of aggregation level 1 and the position of a second and third control channel element of this candidate is mapped to the positions of one candidate of aggregation level 2.

In order to reduce the blocking of aggregation levels, in accordance with another embodiment, the control channel elements for distributed aggregation are mapped to PRBs in RBGs, where at least one PRB is not used for any control channel element belonging to a lower level aggregation candidate. For example, according to FIG. 13 (c), it can be observed that within each RBG of size 4, the second PRB is not used by control channel elements for aggregation levels 1 and 2. Consequently, four such PRBs can be used to form a distributed candidate for aggregation level 4, and/or eight. Such PRBs can be used also to form a distributed candidate for aggregation level 8. In this way, the PRBs remaining within RBGs already partially occupied by candidates of lower aggregation level(s) may be further utilized for candidates of higher aggregation level(s).

One issue that may be taken care of when following the above described rules of mapping is that on one end of the system bandwidth, a fractional RBG may exist, in a case where the system bandwidth in terms of resource blocks is not an integer multiple of the defined RBG size. Alternatively, particularly for small RBG sizes, it can occur that the RBG size is smaller than an aggregation level. So this should be taken in account when mapping R-PDCCH candidates onto that RBG. For instance, in FIG. 11 (b), the first level 4 candidates cannot be mapped such that it end on the third PRB of the first RBG, because then the first control channel element of the candidate cannot be mapped to a usable PRB. The simplest solution is to disable fractional RBGs from being able to carry candidates or control channel elements for blind decoding. Another solution is for those cases where the above described rules would require that the start or end of a candidate are outside the available PRBs, the respective candidate is shifted such that all control channel elements can be mapped on PRBs. So an exception to the rule e.g. in FIG. 11 (b) could be that the first candidate for level 4 is not starting at the third PRB and ends with the sixth PRB, but instead starts at the first PRB and ends with the fourth PRB.

In accordance with an advantageous embodiment of the present invention, the receiving node is a relay node and the transmitting node is an eNodeB, the control information is uplink/downlink grant communicated over R-PDCCH search space configured as described above. The steps performed by such a receiving and transmitting node are illustrated in FIG. 14.

In FIG. 14, solid lines represent an embodiment of the present invention in which a transmitting node maps 1430 control information to be decoded by a receiving node onto a search space. Here, the search space is arranged in accordance with any of the above examples. In particular, the subframes are subdivided into resource units and the control information is blindly decoded from a set of candidates defining the search space. A candidate may aggregate a plurality of the resource units such as control channel elements or physical resource blocks. The search space in frequency domain includes localized candidates and distributed candidates. In particular, lower aggregation level candidates are localized and higher aggregation level candidates are distributed in frequency. The transmitter maps the control information onto the candidates for the particular receiving node and transmits 1440 it accordingly. The receiving node blindly decodes 1480 the candidates of the configured search space and obtains 1480 therefrom the control information, which is further processed in accordance with its purpose.

As described above, the search space may be, in general, configured fixedly, statically, semi-statically or dynamically. The dashed lines in FIG. 14 illustrates an embodiment of the present invention according to which the transmitting node first selects 1410 a search space configuration (i.e. resources available for mapping of the control channel carrying the control information and/or the candidates which are to be monitored by the particular receiving node). The selected configuration is then signaled 1420 to the receiving node. The receiving node receives 1450 indication of the search space configuration and sets 1460 the search space to be monitored (blindly decoded) accordingly. In general, the receiving node may configure the search space instead of the transmitting node.

In particular, in view of the LTE embodiments discussed above, the transmitting node may be the donor eNodeB 510 and receiving node a relay node 520. The search space configuration in terms of candidates assigned to a particular relay node to monitor may be performed dynamically. The search space configuration in terms of resources available to carry R-PDCCH may be configured semi-statically (for instance, by RRC) or fixed.

FIG. 15 illustrates an example network with two relay nodes served by the same donor eNodeB. The present invention is particularly advantageous for more relay nodes since the search space may efficiently assign resources to different relay nodes.

However, the present invention and the above embodiments of configuring the search space are equally applicable to other nodes such as user equipments.

Summarizing, the present invention relates to providing control information within a search space for blind decoding in a multi-carrier communication system. In particular, the control information is carried within a sub-frame of the communication system, the sub-frame including a plurality of control channel elements. The control channel elements may be aggregated into candidates for blind decoding. The number of control channel elements in a candidate is called aggregation level. In accordance with the present invention, the candidates of lower aggregation levels are localized, meaning that the control channel elements of one candidate are located adjacently to each other in the frequency domain. Some candidates of the higher aggregation level(s) are distributed in the frequency.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

The invention claimed is:

1. An integrated circuit comprising:
at least one input, which, in operation, inputs data; and circuitry, which is coupled to the at least one input and which, in operation, controls:

reception of downlink control information mapped to a search space configured on a data region of a downlink subframe, the search space including a plurality of candidates to which the downlink control information may be mapped by a transmission apparatus, and each candidate including a control channel element (CCE) or a plurality of aggregated CCEs, wherein a first aggregation level value for localized allocation where CCE(s) included in a candidate are localized in a frequency domain is smaller than a second aggregation level value for distributed allocation where CCEs included in the candidate are at least partially distributed in the frequency domain; and decoding of the downlink control information that is mapped to one of the plurality of candidates included in the search space.

2. The integrated circuit according to claim 1, wherein the first aggregation level value is a value indicating a maximum aggregation level available for the localized allocation and the second aggregation level value is a value indicating a maximum aggregation level available for distributed allocation.

3. The integrated circuit according to claim 1, wherein the first aggregation level value is a value indicating an aggregation level used for the localized allocation and the second aggregation level value is a value indicating an aggregation level used for distributed allocation.

4. The integrated circuit according to claim 1, wherein the search space only includes candidates for the localized allocation or only includes candidates for the distributed allocation.

5. The integrated circuit according to claim 1, wherein a single search space includes a candidate for the localized allocation and another candidate for the distributed allocation.

6. The integrated circuit according to claim 1, wherein the downlink control information includes uplink grant and downlink assignment information.

7. The integrated circuit according to claim 1, wherein the first aggregation level value is 1 or 2 and the second aggregation level value is 4 or 8.

* * * * *

UNITED STATES PATENT AND TRADEMARK OFFICE
CERTIFICATE OF CORRECTION

PATENT NO. : 10,270,578 B2
APPLICATION NO. : 15/902919
DATED : April 23, 2019
INVENTOR(S) : Alexander Golitschek Edler von Elbwart et al.

It is certified that error appears in the above-identified patent and that said Letters Patent is hereby corrected as shown below:

On the Title Page

<u>Item (56) References Cited, Other Publications:</u>
"ETSI TR 125 913 V8.0.0, "Universal Mobile Telecommunications Systems (UMTS); LTE; Requirements for Evolved UTRA (E-UTRA)and Evolved UTRAN (E-UTRAB) (3GPP TR 25.913 version 8.0.0 Release 8)" should read, --ETSI TR 125 913 V8.0.0, "Universal Mobile Telecommunications Systems (UMTS); LTE; Requirements for Evolved UTRA (E-UTRA)and Evolved UTRAN (E-UTRAN) (3GPP TR 25.913 version 8.0.0 Release 8)--

Signed and Sealed this
Eighteenth Day of June, 2019

Andrei Iancu
*Director of the United States Patent and Trademark Office*